United States Patent [19]

Beisse et al.

[11] Patent Number: 4,556,809
[45] Date of Patent: Dec. 3, 1985

[54] COMBINATION SYNCHRONOUS AND ASYNCHRONOUS ELECTRIC MOTOR

[75] Inventors: Achim Beisse, Oberboihingen; Helmut Härer, Remseck; Adolf Mohr, Bühlertal; Siegfried Schustek, Immenstaad, all of Fed. Rep. of Germany

[73] Assignee: Robert Bosch GmbH, Stuttgart, Fed. Rep. of Germany

[21] Appl. No.: 736,981

[22] Filed: May 22, 1985

Related U.S. Application Data

[63] Continuation of Ser. No. 520,553, Aug. 5, 1983, abandoned.

[30] Foreign Application Priority Data

Aug. 6, 1982 [DE] Fed. Rep. of Germany ....... 3229351

[51] Int. Cl.[4] .............................................. H02K 16/00
[52] U.S. Cl. ...................................... 310/114; 310/62; 310/156; 310/162; 310/211
[58] Field of Search ................ 310/112, 114, 162–165, 310/156, 211, 124–126, 182, 183, 59, 61, 64, 65, 40 MM, 49, 261, 263, 254, 62, 63

[56] References Cited

U.S. PATENT DOCUMENTS

| | | | |
|---|---|---|---|
| 2,047,831 | 7/1936 | Lund | 310/211 |
| 3,614,496 | 10/1971 | Schietart | 310/162 |
| 3,732,448 | 5/1973 | Schiethart | 310/162 |
| 3,979,619 | 9/1976 | Whiteley | 310/156 |
| 4,104,552 | 8/1978 | Tsergas | 310/156 |
| 4,196,366 | 4/1980 | Schiethardt | 310/162 |
| 4,362,959 | 12/1982 | Bartheld | 310/211 |

FOREIGN PATENT DOCUMENTS 2233386 1/1974 Fed. Rep. of Germany ...... 310/125

*Primary Examiner*—R. Skudy
*Attorney, Agent, or Firm*—Frishauf, Holtz, Goodman & Woodward

[57] ABSTRACT

Three rotors disposed in axial succession on a common shaft are mounted to cooperate with a common stator having an annular laminated core coaxial with the shaft on which a three-phase stator winding is wound. The rotors are of two kinds, the middle one being of one kind and the outer ones of the other kind. These two kinds of rotors are, namely, the laminated core kind having a short-circuited squirrel cage conductor system and the synchronous having shell-shaped or ring-shaped permanent magnets mounted on a soft iron yoke which is in turn carried by a pierced hub of nonmagnetizable material. The squirrel cage rotor or rotors provide high starting torque, and the synchronous rotors provide good synchronous torque and a synchronous nominal speed. When the synchronous rotor is in the middle, the stator core may be subdivided into three parts to facilitate cooling.

6 Claims, 4 Drawing Figures ical motor in which the rotor has, in
COMBINATION SYNCHRONOUS AND ASYNCHRONOUS ELECTRIC MOTOR This application is a continuation of application Ser. No. 520,553, filed Aug. 5, 1982, now abandoned.

This invention concerns a kind of synchronous individual pole electrical motor in which the rotor has, in axial succession, a synchronous individual pole exciter system and a powerfully constituted damping cage, and in which there is a common stator with a plural-phase winding on a ring-shaped laminated stator core.

SUMMARY OF THE INVENTION

An object of the invention is to provide, by combination of an asynchronous short-circuited rotor with a synchronous rotor excited by permanent magnets, a drive motor of small external dimensions that has a good starting torque, a high synchronous torque and a constant nominal speed equal to the synchronous speed.

Briefly, the rotary part is subdivided into several, preferably three, rotors seated on and affixed to a common shaft and located axially next to each other, of which at least one is made of stacked sheet metal laminations and is provided with a short-circuiting cage. At least one other of the rotors into which the rotary part of the motor is subdivided is constituted of shell-shaped or ring-shaped permanent magnets, a soft iron yoke and a central perforated hub of nonmagnetizable material carrying the permanent magnets and the soft iron yoke. Two of the three rotors have the same construction, and the third one is disposed at least approximately in the middle between the two other rotors.

THE DRAWING

The invention is further described below by way of illustrative examples with reference to the annexed drawings, in which.

Figure 1:
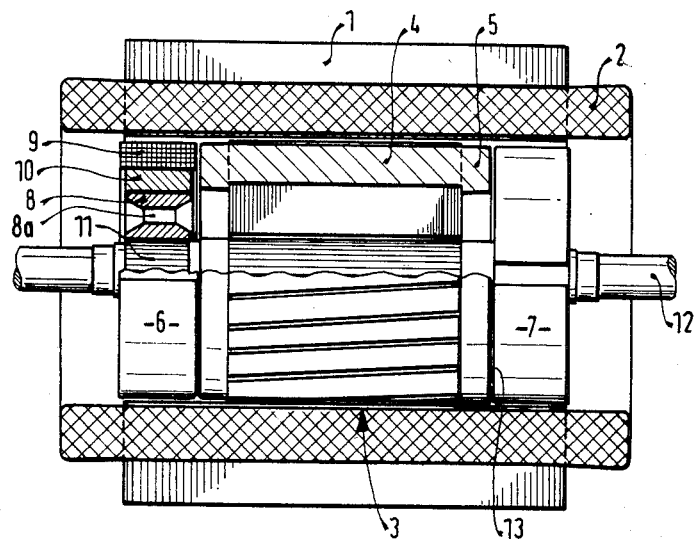
FIG. 1 is a side view, mostly in longitudinal section, of a first embodiment of electric motor according to the invention.

The combined synchronous-asynchronous electrical machine of FIG. 1 has a stator laminated core 1 made of stacked sheet metal laminations, or of a continuous edge wound metal tape, equipped with, typically, a 3-phase winding 2 which is laid down in the stator core 1 over its entire length the stator of the illustrated embodiment is devoid of other windings. A common rotor assembly 3 is rotatably mounted concentrically with respect to the stator core 1. The rotor assembly 3 is composed of a shaft 12 on which three rotor units 4, 6 and 7 are fixedly mounted, namely, a sheet metal laminated rotor unit 4 with a short-circuiting cage 5 of the well-known squirrel cage type and of two synchronous machine rotors 6 and 7 respectively located on opposite sides of the rotor unit 4. The two outer rotor units 6 and 7 and the third rotor unit 4 are firmly connected on a common shaft 12 in a manner leaving gaps 13 between the rotary unit 4 and the substantially identical rotor units 6 and 7 for cooling air.

Figure 4:
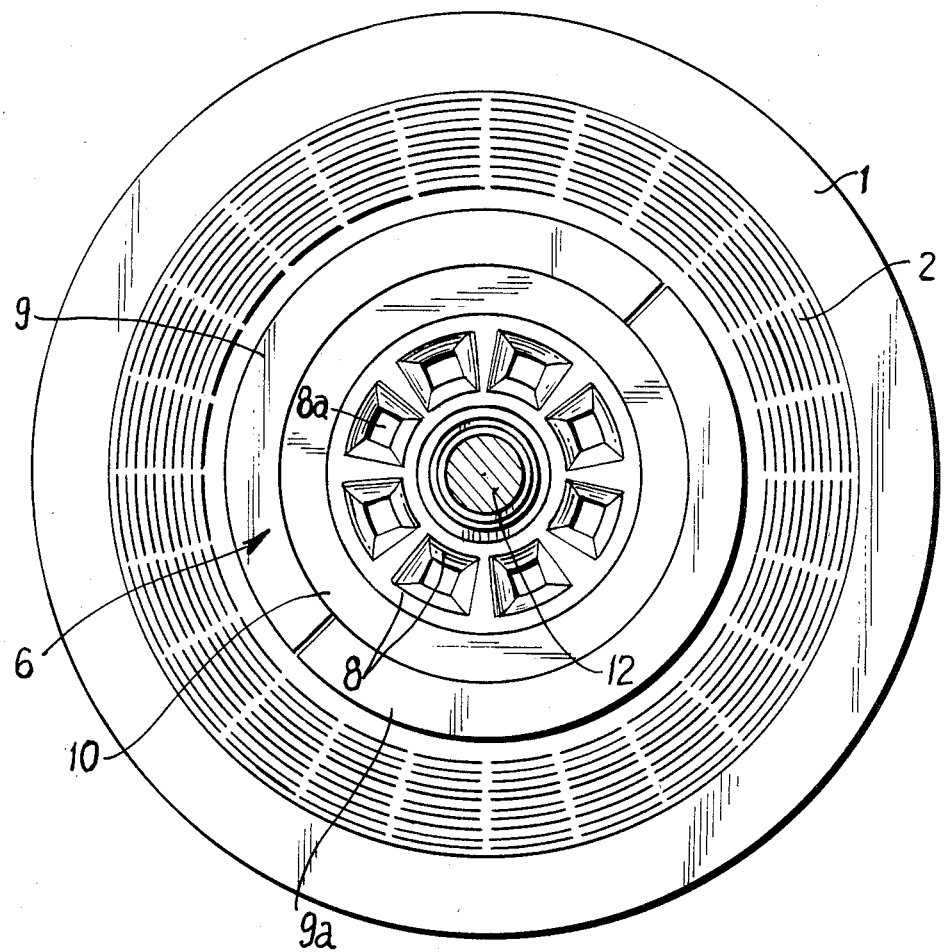
FIG. 4 is an end view of the embodiment shown in FIG. 1, on an enlarged scale, as seen from the left with respect to FIG. 1.

The externally lying synchronous machine rotors 6 and 7 consist, as shown in the radially taken half section at the upper left of FIG. 1, of two half-ring shaped permanent magnets of which one is shown at 9, a soft iron yoke 10 carrying the permanent magnets and a central hub 8 pierced for passage of cooling air through holes 8a which is made of aluminum or plastic which is drawn tightly onto a knurled portion 11 of the shaft 12. The end view of the rotor 6, seen from the left, as shown in FIG. 4 also shows the second half-ring magnet 9a and a plurality of the holes 8a, of which one appears in FIG. 1.

The righthand rotor unit 7 is constituted in the same way as the rotor unit 6 at the left which has already been described. The third rotor unit 4 will generally have an axial length that is about twice to three times the axial length of one of the outer rotor units 6 and 7. The length of the third rotor 4 is determined according to the desired cutting torque. The rods of the short-circuiting squirrel cage 5 are not individually shown in the drawing. They run either parallel to the axis or, in the well-known manner, slightly skewed with respect thereto, and are connected together with cast short-circuiting rings at the end faces of the rotor. These are at a small axial spacing from the inwards-lying ends faces of the outer rotor units 6 and 7. The cool air gases 13 thus formed permit waste heat arising in operation of the machine to be carried away.

Figure 2:
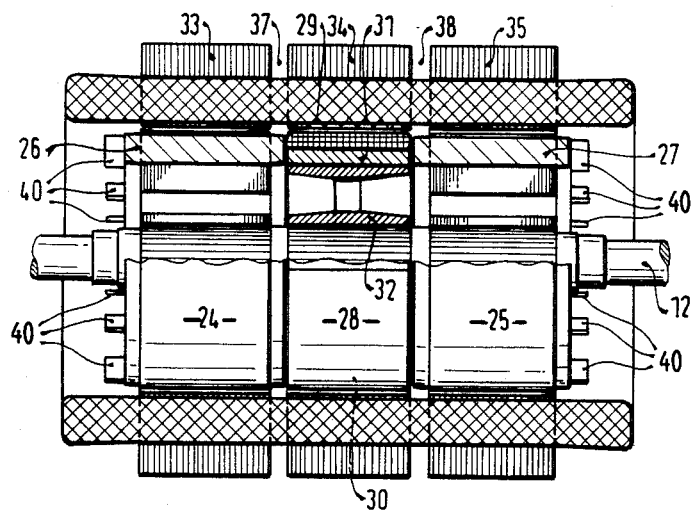
FIG. 2 is a side view, mostly in longitudinal section, of a second embodiment of electric motor in accordance with the invention.

In the embodiment shown in FIG. 2, two outwardly lying laminated core short-circuited rotors 24 and 25 are disposed on the common rotor shaft 12. Each of these outer rotors has a short-circuiting squirrel cage conductor configuration 26,27. Between these outer rotors is the third rotor 28 constructed after the fashion of a synchronous machine rotor which, in the same manner as the rotors 6 and 7 of the first embodiment, consists of two half ring shell-shaped permanent magnets 29 and 30 (corresponding to the half-ring magnets 9 and 9a of FIGS. 1 and 4) and a tubular soft iron yoke 31 carrying the magnets, as well as of a pierced hub 32 of aluminum or of injection molded plastic, pierced like the hubs 8 of FIG. 1.

Just as in the first illustrative embodiment, a common stator winding 2 likewise made up of two or more phase windings passes through the entire axial length of the machine. In contrast to the first embodiment, the stator in this case can be subdivided into three stator lamination packs 33,34 and 35, each related to one of the individual rotors 24,25 and 28, leaving intermediate gaps 37 and 38 for the passage of cooling air between the rotor 28 and identical rotors 24 and 25. For improvement of the cooling effect, turbulence producing blade elements 40 are provided at the annular end faces of the respective short-circuiting squirrel cage conductor configurations 26 and 27.

In the structure of FIG. 1 the central rotor 4 is particularly useful for its contribution to the starting torque of the motor and the rotors 6 and 7 for their contribution of speed synchronization and running torque. In the structure of FIG. 2 the central rotor 28 is particularly useful for its contribution of speed synchronization and running torque and the rotors 24 and 25 for their contributions of starting torque.

Figure 3:
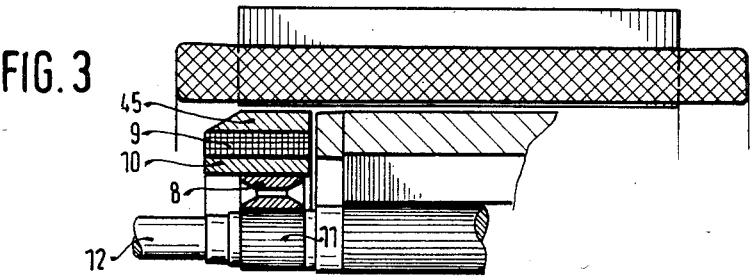
FIG. 3 is a detail view, in longitudinal section, of a modification of the embodiment of FIG. 1.

As shown in FIG. 3, the use of flux concentrators 45 seated on the permanent magnets and serving for intensification of the air gap flux can be advantageous.

Although the invention has been described with reference to illustrative examples, it will be understood that further variations and modifications are possible within the inventive concept.

For example, the flux concentrating bodies 45 shown in FIG. 3 can be provided externally of the squirrel-cage conductor configurations 26 and 27 of the rotors 24 and 25 of FIG. 2 in the same manner as they are shown in FIG. 3 mounted radially outward of the magnet elements 9 which correspond to the magnet elements 9 of FIG. 1.

The stator core and winding may produce a rotary magnetic field in any of the known ways. Preferably the stator is energized by 3-phase alternating current, in which case the stator can be wound in any conventional way for a delta-connected or star-connected winding.

We claim:

1. A combination synchronous and asynchronous electric motor having an annular laminated stator core provided with a plural-phase winding thereon and devoid of other windings and a rotary shaft coaxial with said stator core, and further comprising:

a compound rotor structure fixedly mounted on said shaft composed of two substantially identical rotors (6,7) each having arcuate permanent magnet elements (9) mounted on a magnetically soft yoke (10) carried on a nonmagnetic hub (8) affixed to said shaft having passages (8a) pierced therethrough for passage of cooling air, and a third rotor (4) located between said substantially identical rotors and having a laminated core and a short-circuiting squirrel-cage conductor configuration mounted on said core, said core being affixed to said rotor shaft, gaps (13) for cooling air being provided between said third rotor (4) and said substantially identical rotors (6,7), whereby said third rotor contributes starting torque and said identical rotors contribute speed synchronization and running torque when said stator winding is electrically energized to cause the machine to operate as a motor.

2. Electric motor according to claim 1, in which said substantially identical rotors are provided with flux concentrator bodies (45) of profile tapered down at their respective ends at or near the axial extremities of said rotor structure, located radially outward of said magnet elements (9), for concentrating flux in the air gap between said rotor structure and said stator core.

3. A combination synchronous and asynchronous electric motor having an annular laminated stator core provided with a plural-phase winding thereon and devoid of other windings and a rotary shaft coaxial with said stator core and further comprising:

a compound rotor structure fixedly mounted on said shaft composed of two substantially identical rotors (24,25) each having a laminated core and a short-circuiting squirrel-cage conductor configuration and a third rotor (28) located between said substantially identical rotors and having arcuate permanent magnet elements (29,30) mounted on a magnetically soft yoke (34) carried on a nonmagnetic hub (32) affixed to said shaft having passages (8a) pierced therethrough for passage of cooling air, gaps (37,38) being provided for passage of cooling air between said third rotor (28) and said substantially identical rotors (24,25), whereby said identical rotors contribute starting torque and said third rotor contributes speed synchronization and running torque when said stator winding is electrically energized to cause the machine to operate as a motor.

4. Electric motor according to claim 3, in which said laminated stator core is subdivided into three laminated annular core portions disposed in an axial row with axial spacing of one from the next, and in which the same stator winding, serving all three stator components and extending axially from one end to the other of the stator, is carried by said stator components.

5. Electric motor according to claim 4, in which at the outer end faces of said two substantially identical rotors, blades (40) are mounted for producing air turbulence for cooling purposes.

6. Electric motor according to claim 3, in which flux concentrator bodies (45) are provided radially outward of said squirrel-cage conductor configuration of each of said substantially identical rotors (24,25), said bodies having a profile tapered towards their ends located at or near the axial extremities of said rotor structure, for concentrating flux in the air gap between said rotor structure and said stator core.

* * * * *